Dec. 9, 1924.

R. V. MORSE 1,519,002

BOMB DROPPING SIGHT

Filed May 2, 1921    5 Sheets-Sheet 4

INVENTOR
Robert V. Morse

Dec. 9, 1924.  1,519,002
R. V. MORSE
BOMB DROPPING SIGHT
Filed May 2, 1921   5 Sheets-Sheet 5
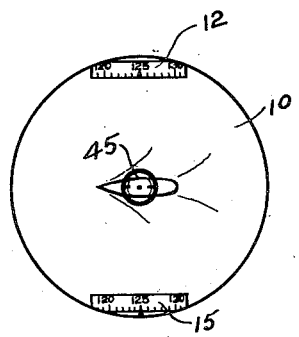
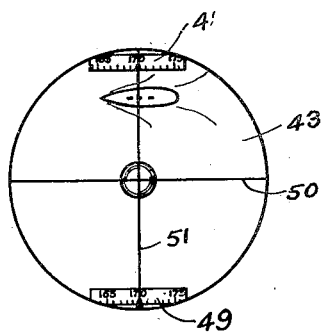
FIG. 5
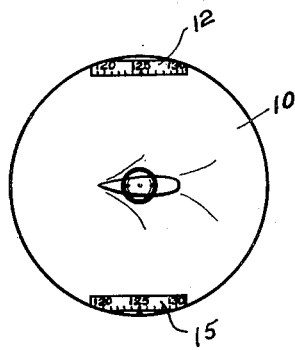
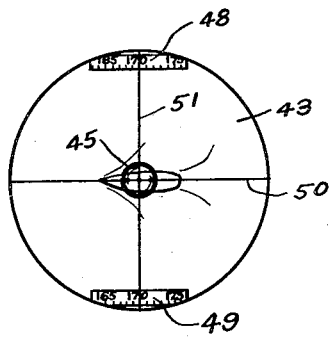
FIG. 6
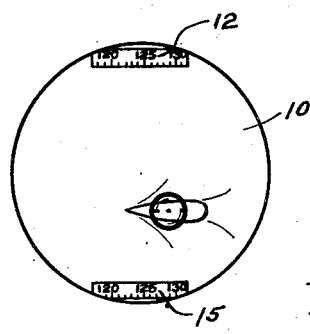
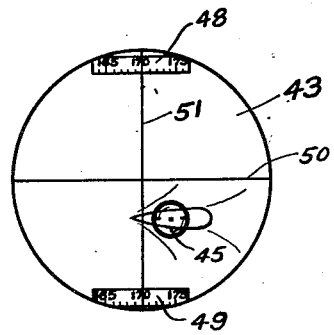
FIG. 7
INVENTOR
Robert V. Morse Patented Dec. 9, 1924.

1,519,002

UNITED STATES PATENT OFFICE.

ROBERT V. MORSE, OF ITHACA, NEW YORK.

BOMB-DROPPING SIGHT.

Application filed May 2, 1921. Serial No. 466,298.

*To all whom it may concern:*

Be it known that I, ROBERT V. MORSE, a citizen of the United States, residing at Ithaca, in the county of Tompkins and State of New York, have invented a new and useful Bomb-Dropping Sight, of which the following, taken with the accompanying drawings, is a specification.

This invention relates to the military arts, and in particular to the dropping of bombs from aircraft. It is concerned with the sighting apparatus by which the bomb is aimed and by which the precise instant for its release is determined. The invention has for its objects the improvement of the accuracy of such apparatus, the provision of continuous determinations and visible indications so as to reduce errors due to changing conditions, the automatic compensation of certain sources of error, and in general the increase of effectiveness of such apparatus.

Figure 1:
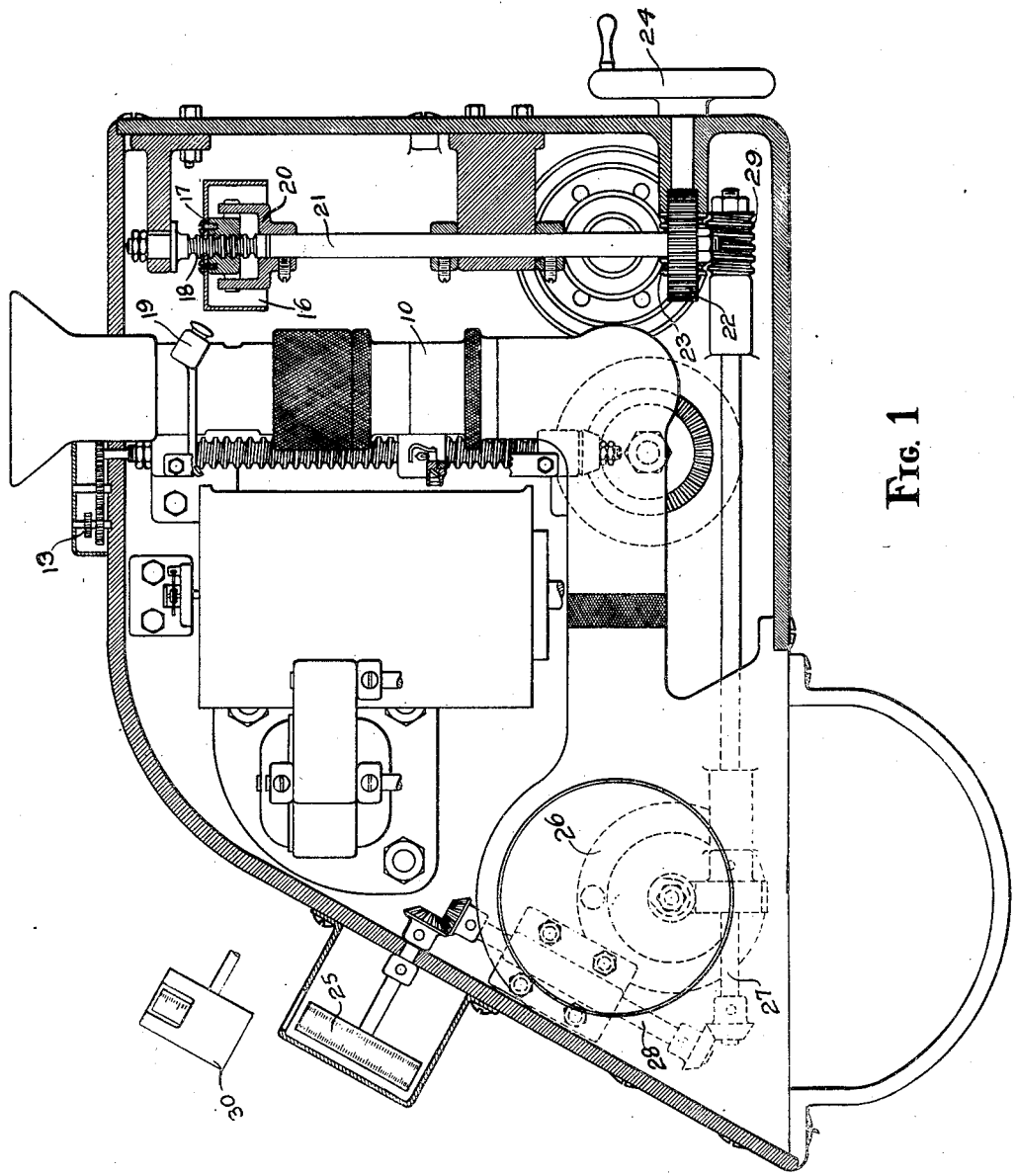
Figure 2:
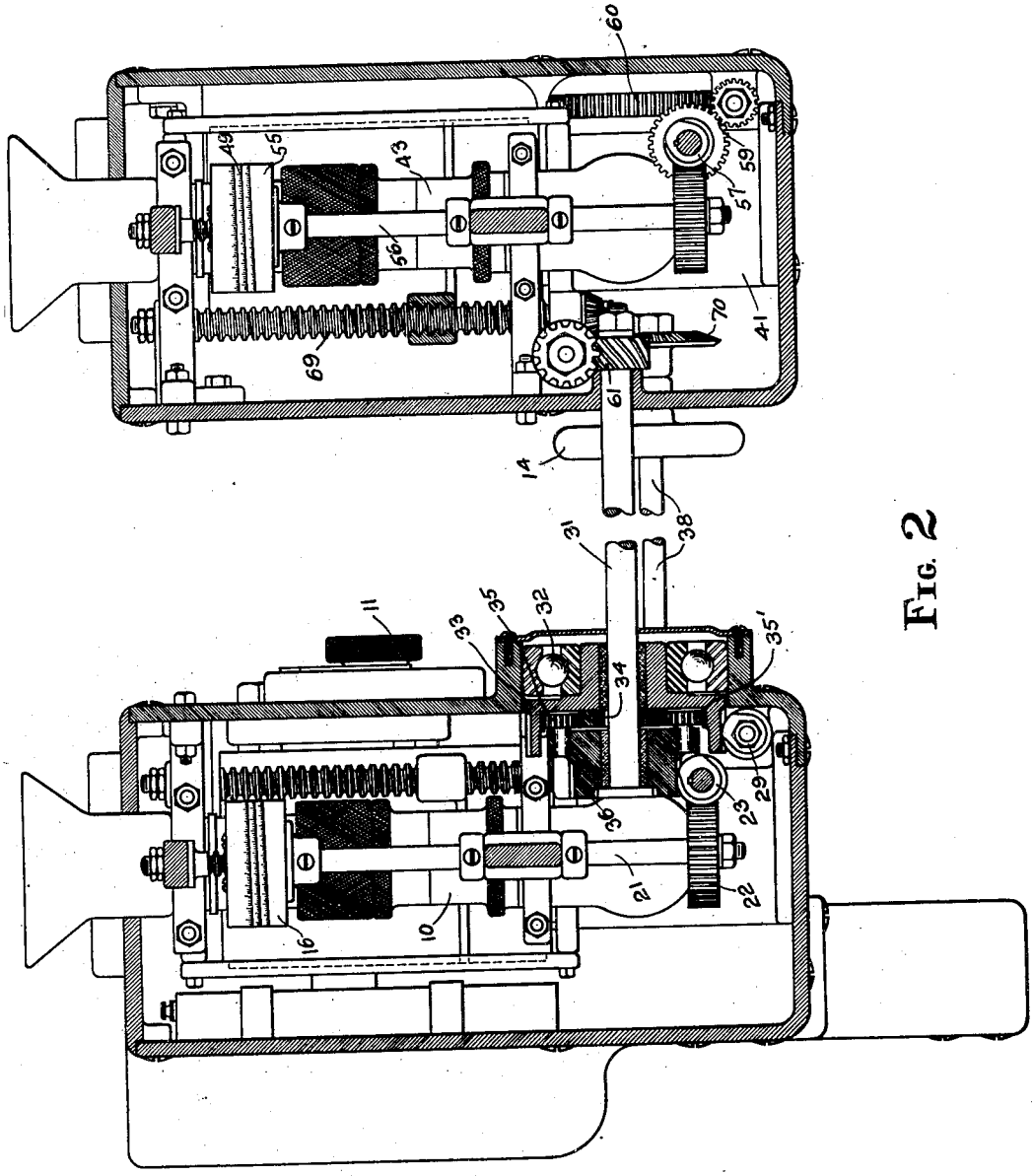
Figure 3:
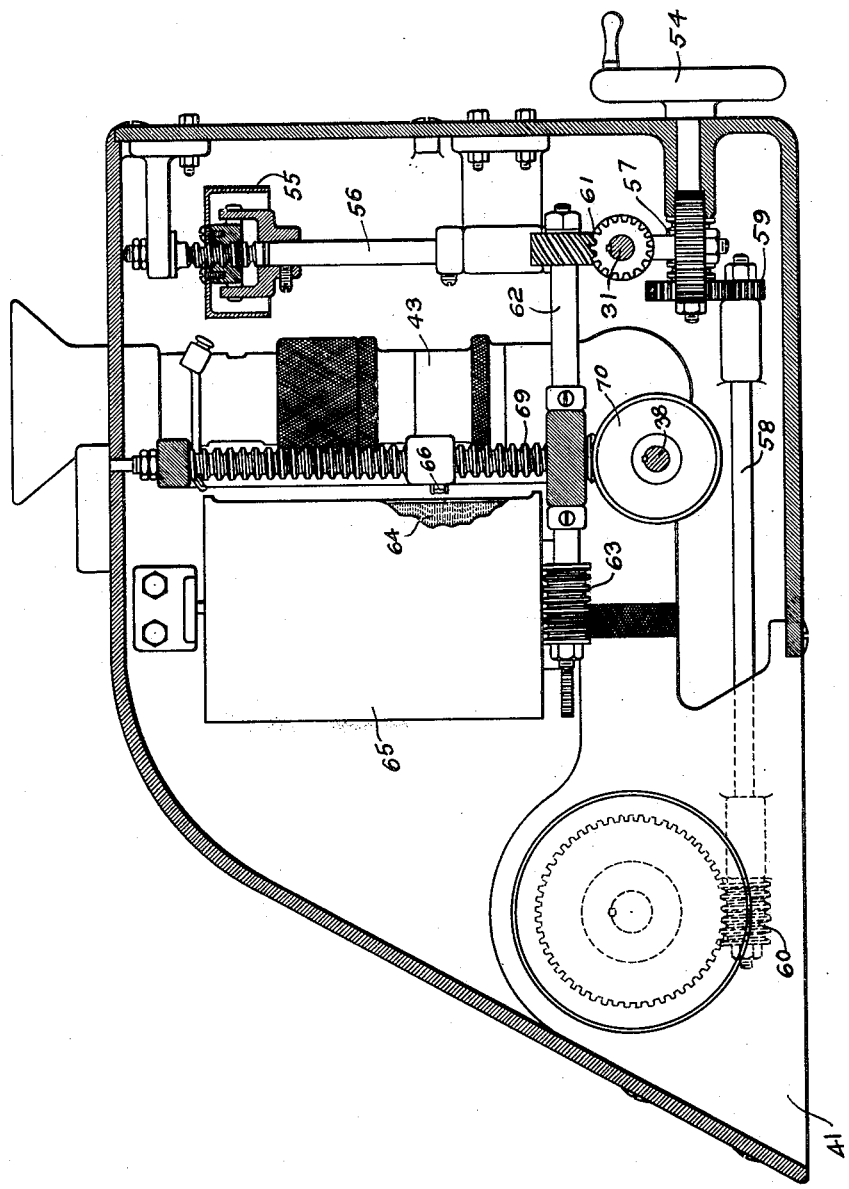
Figure 4:
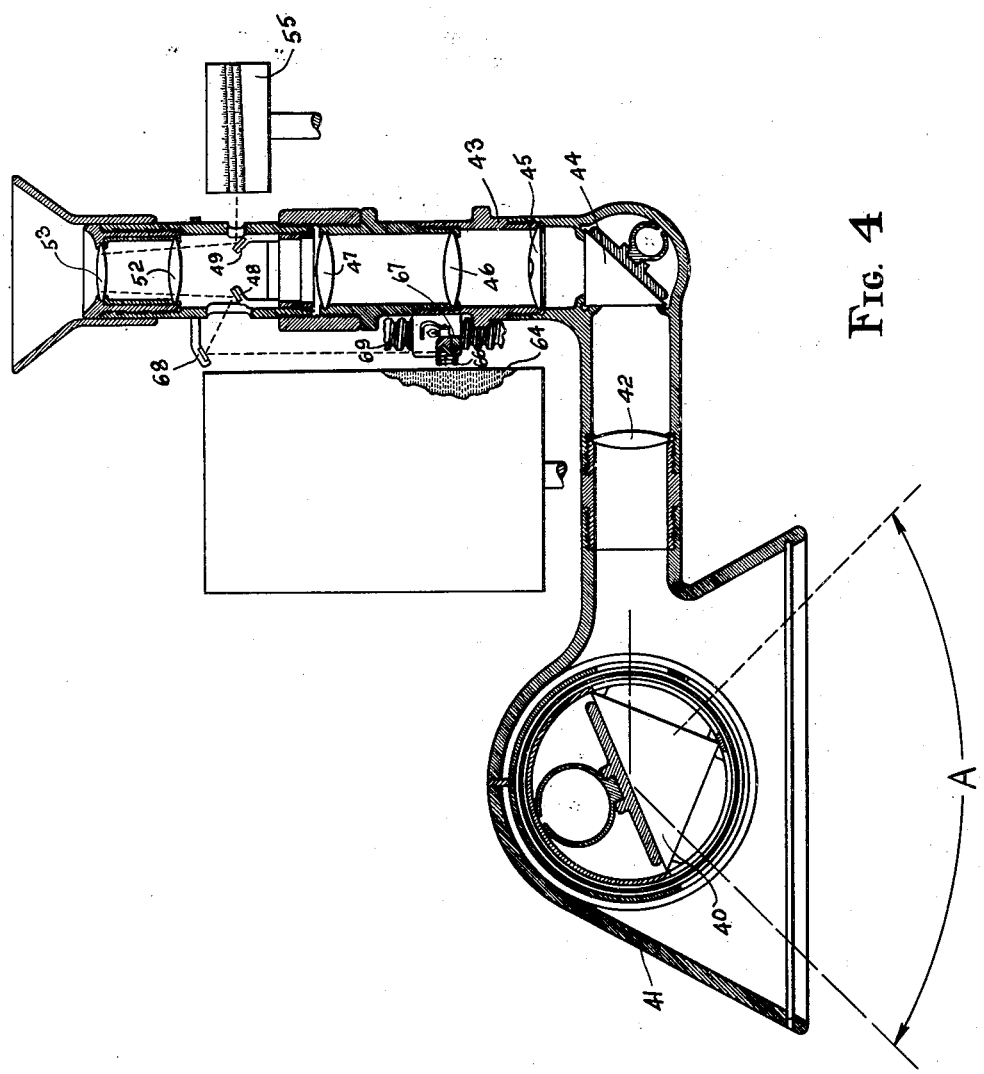

In the drawings Fig. 1 is a side view of the speedometer with the cover removed to show the mechanism, of which some parts are shown broken or omitted, in order to more clearly illustrate the portions more directly concerned with bomb dropping; Fig. 2 is a rear view of the apparatus showing the speedometer as connected to the bomb sight proper; Fig. 3 is a side view of the bomb sight with the cover removed to show the mechanism; Fig. 4 is a view in cross-section of the optical system of the bomb sight, which is in general similar to the optical system of the speedometer; Fig. 5 shows a target as viewed thru the sights prior to dropping the bomb; Fig. 6 shows a target at the instant the bomb is released; and Fig. 7 shows another position the target may appear to have at the instant the bomb is released.

The apparatus consists in general of two parts, first a speedometer at which the speed of the aircraft relative to the ground, the speed of the aircraft relative to the air, and the wind velocity are continuously determined. These values are combined in such a manner that they may give the desired motion of control to a single shaft, which motion, together with the altitude setting, are transmitted to the main bomb sight apparatus, which continuously determines the correct setting for the bomb sight and permits that setting to be continuously maintained in the actual adjustment of the sight. Thus instead of setting the sight intermittently from data of a past time interval, the sight is always ready for action and is continuously adjusted to the correct setting from fresh contemporaneous data. It is this bomb sight which forms the second part of the apparatus.

Taking up first the speedometer portion, which is shown in Fig. 1 and the left hand part of Fig. 2, the telescope 10 and its associated mechanism is so arranged that when adjusted to the correct speed by operation of the controlling rheostat 11 the objects on the earth below appear to be stationary in the field of view of the telescope, and the corresponding speed of the ground relative to the aircraft is shown by the reading of the scale 12 visible in the field of the telescope 10, as illustrated for example in Fig. 5. The reading of course depends also on the altitude setting, which is read from the altimeter of the aircraft and set at the indicator 13 by turning the handwheel 14. The details of this ground speed portion of the speedometer are described more fully in the patent for airplane speedometer, No. 1,509,167, granted to me on the 23d day of September, 1924, and its detailed construction is immaterial to this invention, as any type of continuous reading round speedometer, whose reading is shown in the field of view of its telescope, might be used. The general features of this invention might indeed be used with any ordinary speedometer capable of giving the ground speed.

In combination with the scale mirror 12 which gives the ground speed, this invention employs a second scale mirror 15 in the field of vision of the telescope 10, as shown in Fig. 5 for example,—the general arrangement of the scale mirrors 12 and 15 in the telescope 10 being similar to the arrangement of the mirrors 48 and 49 shown in Fig. 4. This scale mirror 15 reflects the reading from the rotatable drum 16, carried on a nut 17 which can turn on a fixed screw 18. The drum 16 has marked on its outer surface readings like those shown in the scale 12, these markings being arranged helically around the drum 16 and illuminated by the small electric light 19. The nut 17 and drum 16 may be rotated by fingers 20 keyed to the shaft 21, which can be turned by a worm wheel 22 and worm 23 operated by the handwheel 24. In operating the device the drum 16 is turned by the handwheel 24 so that the reading shown in the mirror 15 is the same as the reading shown in the mirror 12,—for a purpose which will be described later.

On another portion of the apparatus shown in Fig. 1 is arranged another adjustable scale 25, which can be turned by a handwheel 26, (shown dotted), which is connected thereto by shafts 27 and 28, and suitable gearing. The other end of the shaft 27 terminates in a worm 29, which is thus turned according to the scale 25. Adjacent to the scale 25 there is arranged a speedometer 30 which is connected so as to give a reading of the speed of the aircraft relative to the air,—as by connecting the speedometer 30 to the engine or to a suitable airscrew for example. The operator, by turning the handwheel 26, adjusts the reading of the scale 25 so as to accord with the reading of the speedometer 30,—such adjustment being necessary only at infrequent intervals, as the air speed or engine speed is generally substantially constant.

The motion or setting of the worm 23,— turned according to the ground speed,—and the motion or setting of the worm 29,— turned according to the air speed,—are combined by the action of a planetary or differential mechanism, so that a motion or setting corresponding to the wind velocity is obtained and transmitted to the shaft 31 (see Fig. 2). This latter motion or setting is slightly modified in some cases by a variation of the scale 25, as will be described, but in general the motion of the shaft 31 is substantially proportional to the wind velocity, as stated. One illustrative form of the differential mechanism by which the ground speed and air speed are thus combined, will now be described.

Mounted in the ball bearings 32, as shown in the left hand part of Fig. 2, is a planetary gear casing 33, thru the center of which passes the shaft 31. The central gear 34 of the planetary system is keyed to the shaft 31, and the planetary gears 35 and 35′ have their shafts mounted in a collar 36 which can turn freely on the shaft 31. This collar 36 has suitable worm-wheel teeth cut on it so that it can be turned by the worm 23,—so that the planetary gears 35, 35′ are rotated bodily with the collar 36 in proportion to the ground speed of the aircraft. The planetary gears 35, 35′ mesh with internal teeth of the planetary casing 33 as in any ordinary planetary gearing, and this casing 33 is turned by the worm 29 operated by the handwheel 26 according to the air speed or engine speed of the aircraft. The motion transmitted to the central gear 34 on the shaft 31 is thus dependent on both the airspeed setting and the ground speed, and by suitably proportioning the gearing the motion can be made proportional to the difference thereof, as will be understood by those familiar with the principles of differential or planetary gearing.

In addition to the shaft 31, the speedometer portion and the main bomb-sight portion are connected by the shaft 38 operated by the handwheel 14, so that the altitude settings of the two portions of the apparatus are adjusted simultaneously and in exact accord.

Taking up now the main bomb-sight portion of the apparatus, which is illustrated in the right hand portion of Fig. 2, and in Fig. 3 and Fig. 4, we will first consider by way of example the optical system illustrated in Fig. 4. The ordinary bomb sight has a mirror, prism, telescope, or other optical element which can be tilted forward at a certain computed sight angle so as to show the point at which the bomb will strike when dropped. This feature is embodied in various forms in various types of sights, and in the apparatus shown by way of example in Fig. 3 and Fig. 4, the reflecting prism 40 is rotatably mounted in the hood 41 so that the line of sight can be swung to any desired angle A with the vertical. The light reflected from the prism 40 passes thru the objective lens 42, is then reflected up the vertical part of the telescope 43 by the prism 44, and forms an inverted image in the region of the leveling bubble 45, which is constructed of transparent fluid in a glass casing. As explained in detail in Patent No. 1,509,167, for airplane speedometer, granted to me on the 23d day of September, 1924, the curvature of the glass of the level 45 is so proportioned that the bubble moves around in the same direction and amount as external objects viewed thru the telescope when the tube 43 is slightly tilted in any direction from the vertical, so that when the bubble is used as an indicator point it acts to automatically compensate any slight errors in the leveling of the apparatus. The light after passing the bubble 45 passes thru the inverting lenses 46 and 47, which rectify the image. The rectified image is formed in the region of the small prisms or mirrors 48 and 49, which serve to reflect scale readings in the field of view of the telescope in a manner similar to the prisms or mirrors 12 and 15 in the telescope 10. A pair of crosshairs 50 and 51 are also located in the focal plane of either the inverted or rectified image. The eye-piece lenses 52 and 53 magnify the resultant image. The operator thus may view simultaneously the landscape, the scale readings, and the sighting lines or bubble.

The reading of the proper bomb sight setting is automatically determined by the mechanism and continuously shown in the upper scale mirror 48, and the operator adjusts the reading of the lower scale 49 to correspond, by operating the hand-wheel 54, and thereby sets the sight angle A. Referring more particularly to Fig. 3 for an illustrative form of the mechanism, the drum 55 is provided with a helical scale and is turned by the vertical shaft 56,—the general mounting and arrangement being the same as that of the drum 16 and shaft 21 described in connection with Fig. 1. The shaft 56 is turned by worm gearing 57 operated by the handwheel 54, which also turns the horizontal shaft 58 thru the spur gearing 59. The shaft 58 thru a worm gearing 60 turns the rotatable mounting in which the reflecting prism 40 is carried, so that the line of sight of the prism 40 may be adjusted to any desired angle A. The amount of this adjustment is given on the drum 55,—the reading being reflected into the field of view of the telescope 43 as described.

Having described the manner in which the sight angle A may be adjusted to any desidered reading, we will now take up the manner in which the amount of this reading is determined. The shaft 31 thru a pair of spiral gears 61 turns the shaft 62, which operates a worm gearing 63 so as to rotate a drum 64 in the casing 65. The drum 64 carries a large number of separate scales, one above the other, arranged in somewhat the same manner as the scales on the drum of the speedometer of my copending application above referred to,—that is, a separate scale is used for each altitude, the scales being determined for intervals of 100 feet from say 1,000 to 10,000 feet altitude. These scales are much reduced in size in order that they may be accommodated on a drum of moderate size, and the readings are magnified by the small lens 66 and reflected by the small mirror 67 to the small mirror 68, and thence into the mirror 48 in the field of view of the telescope 43 as described. The small lens 66 and mirror 67 are adjustable vertically by a screw 69, so that they may be set opposite any desired scale on the drum 64, and this screw 69 is turned by the bevel gearing 70 run by the shaft 38. It will be recalled that this shaft 38 is turned by the handwheel 14 according to the altitude setting desired. Thus the apparatus is adjusted so as to read from the particular scale corresponding to the given altitude. The scales are illuminated by suitable electric lights.

The problem of bomb dropping as ordinarily treated is considered as involving a considerable number of variable quantities, such as the altitude of the aircraft, its velocity relative to the earth, its velocity relative to the air, and the velocity of the wind relative to the ground. Yet in the foregoing description the determination has been made to apparently depend upon but two variables,—for we have spoken of obtaining the reading by (1) adjusting the lens and mirror 66 and 67 by the screw 69 according to the altitude, and (2) then turning the drum 64 by means of the shaft 31, and then merely taking the reading that that particular scale on the drum 64 gives. The question naturally arises whether, for any one particular altitude, it is possible to so mark a scale that when turned by a single shaft 31 it will read correctly the bomb sight angle A.

Upon consideration of the problem it will be seen that, for a given altitude, only the two factors of ground speed and wind velocity are really necessary to a determination,—the factor air speed merely entering the problem as a means of determining the wind velocity,—using the formula wind velocity=ground speed—air speed. Hence it will be seen that it is not impossible to express the problem as of two variables. Yet in our mechanical problem we are limited to a one-dimensional scale for each altitude, and since a one-dimensional scale can be calibrated according to only a single variable, it is necessary to ascertain what this variable may be, and how it can be mechanically produced in the shaft 31. Considering the problem as involving two known factors, ground speed and wind velocity, it will be seen that this also can be expressed as (ground speed) and (ground speed minus air speed),—this latter form also involving but two factors. Of these factors air speed may be considered a constant for any particular type of aircraft operating under bombing conditions, thus leaving but a single variable ground speed remaining; in other words, for any particular ground speed at a particular altitude there is but one value for the bomb sight setting in a given particular type of bombing airplane. This is by no means the same as saying the bomb sight setting is proportional to the ground speed; for the setting is dependent upon both the ground speed and ground speed minus a constant, and the determination of the effect of these factors is based on empirical rather than purely mathematical formulæ.

The problem might also be stated as involving merely the wind velocity and wind velocity plus a constant. But as we have no way of directly observing or measuring wind velocity relative to the ground except by operations involving the measurement of ground speed, the expression of the problem in terms of ground speed is probably preferable.

It may be argued that though the assumption of a standard air speed for the bombing plane is in general sound and permissible, occasions will undoubtedly occur when the air speed of the plane varies more or less from the standard, owing to the failure of the pilot or engineer to maintain his engines at a constant speed of rotation. For example, the standard air speed of the plane may be 90, the actual air speed at the time may be 87, and the ground speed 60. The bomb sight angle A would accordingly be set for the value corresponding to a ground speed of 60 and a wind of 30, when it should be set for a ground speed of 60 and a wind velocity of 27. The difference in the setting would not be great, yet in order that we may closely approach the highest precision possible in such operations it is desirable to make some provision for it. Accordingly the scale 25 is provided, and is adjusted to correspond to the actual engine or air speed of the plane. The scale 25 is so calibrated that when set say at 87 instead of 90, the setting of the shaft 31 is modified thru the action of the differential gears in the casing 33 so as to substantially compensate for the difference between a 30 mile and a 27 mile adverse wind. As the difference is generally not great, a single approximate scale may generally be used on the drum 25,—calculated for average altitude conditions,—or say three scales calculated for low, medium and high altitudes. Of course, if it is desired, a large number of scales may be employed on the drum 25,—a separate scale for each altitude,—with an indicating pointer moved from scale to scale by a screw similar to the screws employed to shift the small lenses and mirrors of the speedometer and bomb sight described. But owing to the comparatively small actual magnitude of the correction required, the added precision obtained by such a multiplicity of scales on the drum 25 is more apparent than real, so far as the results in actual operation are concerned.

The general operation of the apparatus can now be described. It is preferably operated by two men,—one at the speedometer and one at the bomb sight, though it can be operated by one man who first adjusts the speedometer and then shifts his eye to the bomb sight. Assuming that it is operated by two men, the altitude is read from an ordinary barometric altimeter, corrected for the altitude of the ground, and set at both parts of the apparatus by turning the handwheel 14 on the shaft 38. The man looking thru the telescope 10 of the speedometer portion of the apparatus sees the ground travelling beneath him, and adjusts the rheostat 11 until the objects become apparently stationary in his field of view. He then reads the ground speed in one of the scale mirrors 12 in his field of view, and then turns the handle 24 until the reading in the scale mirror 15 is the same as in the mirror 12. He also occasionally glances at the speedometer 30 to see if the engine speed is staying constant, and if necessary adjusts the scale 25 to correspond to the speedometer 30. While the first man is thus maintaining his speed readings, the man at the bomb sight 43 looks thru his telescope and sees his proper bomb sight setting expressed in figures in his upper scale 48, and he turns the handwheel 54 until the same reading is shown in the lower scale 49,—thereby adjusting the sight angle A to the correct value. While noting from time to time that this correspondence between the scales 48 and 49 is preserved, he watches the landscape travelling across the field of vision of the telescope 43. If the bubble 45 lies on the intersection of the cross-hairs 50 and 51, as it normally should, the operator releases the bomb at the instant the target crosses the cross-hair 50. If however the bubble 45 should happen to move off at that particular moment, the operator uses the bubble for his sighting point instead of the cross-hairs, and thus avoids an error which would result from a momentary tilt of the airplane. The target is preferably approached by flying against the wind, and the airplane is held on a straight course by laying the vertical cross-hair 51 thru the target and holding the airplane strictly on that line by the use of electrical indicators operated by turning the apparatus relative to the airplane as is commonly done with bomb sights. The bubble 45 is used in place of the cross-hair 51 in case of momentary lateral tilts. In general of course every effort is made to keep the whole apparatus level, with the bubble 45 in the center of the field of view, and to this end the apparatus may be mounted in gimbals or other suitable mountings customarily used with bomb sights, to permit leveling relative to the airplane.

From the fact that the problem of bombing can be practically reduced to a function of ground speed, with certain constants and minor variations, as described, it will be evident that the bomb sight setting scales on the drum 64 might be directly substituted for the ground speed scales on the somewhat similar drum used with the telescope 10 and read in the mirror 12,—in which case the mirror 15 would have the same function as the mirror 49, and read bomb sight setting,—except of course that the actual setting might slightly differ after passing thru the differential gearing if modified by a setting of the scale 25 at other than normal speed. The angle of the bomb sight might thus be directly controlled, so that no readings or mirrors would be required at the bomb sight.

In the foregoing description reflecting elements have generally been referred to as mirrors. It will be understood that any equivalent device such as prisms for example may be used, and in general the particular type of optical and mechanical elements herein illustrated need not necessarily be employed, but that various other arrangements and modifications of the apparatus may be used as will be evident to those skilled in the art. The particular instrument shown is given merely by way of illustration, and the essential features and combinations which constitute the invention are embodied in the following claims:

1. In a bomb dropping sight, the combination of a telescope thru which the ground may be observed, means for indicating in the field of vision of the telescope the amount of the ground speed, a second indicating means arranged to be read in the field of vision of the telescope, means for adjusting the second indicating means according to the reading of the first mentioned indicating means, a second telescope, means for indicating in the field of vision of the second telescope the desired angle for the bomb sight setting, said last mentioned means being mechanically connected with the second indicating means of the first mentioned telescope, means for adjusting the line of sight of the second telescope to various angles of bomb sight setting, and a further indicating means arranged to be read in the field of vision of the second telescope and mechanically connected to the last mentioned adjusting means, whereby the line of sight of the second telescope may be adjusted to accord with the desired angle of setting as indicated in the field of vision of said second telescope.

2. In a bomb dropping sight, the combination of a sighting telescope, means for indicating in the field of vision of said telescope the desired angle of setting, means for adjusting the line of sight of the telescope to various angles of setting, a further indicating means arranged to be read in the field of vision of the telescope and mechanically connected to said adjusting means, whereby the line of sight of said telescope may be adjusted to accord with the desired angle of setting as indicated in the field of vision of said telescope.

3. In a bomb dropping sight, the combination of means for determining the ground speed, an indicating means arranged so that it may be set to accord with said determination, a second indicating means which can be adjusted according to the air speed, a shaft, a gear mechanism arranged to drive said shaft, said gear mechanism being also mechanically connected to both of said indicating means, whereby the motion of the shaft is modified according to both the ground speed and air speed, means operated by said shaft for determining the angle of sight for bomb dropping, and means for varying the last mentioned determination according to the altitude above the ground.

4. In a bomb dropping sight, the combination of a shaft, a differential gearing arranged to drive said shaft, one branch of said differential gearing being controlled according to ground speed and the other branch suitably modifying the action according to air speed, an indicator drum mechanism having bomb sight settings thereon and operated by said shaft, and means for varying the reading of said drum according to the altitude.

5. In a bomb dropping sight, the combination of a drum carrying a large number of bomb sight setting scales arranged to give separate scales for different altitudes, said scales being reduced in size, a magnifying lens adjustable longitudinally of the drum according to the altitude, a bomb dropping sight, and means for making the magnified reading of the drum visible in the field of view of the sight.

6. In a bomb dropping sight, the combination of a sighting telescope, a rotatable scale, means for making the reading of the scale visible in the field of the telescope, a manual control means by which said scale may be adjusted, gearing connecting said control means to said scale, means whereby the line of sight of the telescope may be inclined according to the desired angle of sight setting, said last mentioned means being controlled by said manual control means.

7. In a bomb dropping sight, the combination of a sighting telescope, a rotatable scale drum having a scale arranged thereon in the manner of a helix, means for shifting the reading point longitudinally of the drum as the scale is rotated, means for making the reading of the scale visible in the field of the telescope, means whereby the line of sight of the telescope may be inclined according to the desired angle of sight setting, and a control means, said control means being mechanically connected to both the scale drum and to the means for inclining the line of sight of the telescope.

8. In a bomb dropping sight, the combination of a sighting telescope, a scale arranged so that it may be seen in the field of vision of said telescope, a second scale arranged so that it may be seen in the field of vision of said telescope, means for adjusting the second scale to accord with the readings of the first mentioned scale, a movable indicating point arranged so as to be visible in the field of view and mounted so that it will move in the same direction and amount as the apparent motion of external objects caused by tilting of the telescope, whereby the location of the indicating point and the readings of the two scales may be simultaneously viewed by the operator when dropping bombs.

9. In a bomb dropping sight, the combination of a differential gearing, a control means for operating one element of the differential gearing, a second control means for operating another element of the differential gearing, a shaft operated according to the resultant motion of the differential gearing, a rotatable scale drum, gearing connecting said shaft to rotate said drum, control means for varying the reading of the drum according to the altitude, a sighting telescope, means whereby the reading of the scale may be shown in the field of view of the telescope, a movable sighting point arranged so as to be visible in the field of view and mounted so as to automatically compensate for moderate errors in leveling, a second scale arranged so that it may be seen in the field of view of the telescope, control means connected to said second scale for adjusting the inclination of the line of sight of the telescope, whereby the correctness of the settings may be checked at the moment of dropping the bomb.

10. In a bomb dropping sight, the combination of a telescope thru which the ground may be observed, means for indicating in the field of view of the telescope the amount of the ground speed, a second indicating means arranged to be read in the field of view of the telescope, means for adjusting the second indicating means according to the reading of the first mentioned indicating means, a differential gearing mechanism connected to said adjusting means, a second adjusting mechanism for introducing a correction when the air speed of the aircraft varies from normal, said second adjusting mechanism being connected to the differential gearing, a shaft turned according to the resultant motion of the differential gearing, a drum mechanism turned by the rotation of said shaft, a large number of scales on the drum, means for reading different scales according to different altitudes, a sighting telescope, means for making the scale reading visible in the field of view of the telescope, a second scale arranged to be read in the field of view of the sighting telescope, means connected to said second scale for adjusting the sighting angle of the sighting telescope, and a movable sighting point in the field of view of said sighting telescope, said point being mounted so that it automatically shifts its position in the field of view so as to compensate for moderate errors in the leveling of the sighting telescope.

11. In a bomb dropping sight, the combination of means for determining the ground speed, a bomb sight setting scale calibrated for a certain altitude on the basis of a certain normal air speed of the aircraft combined with the various ground speeds,—that is, on the basis of the various net wind velocities,—means for modifying the setting of the scale to correct for variations of the airspeed from normal, and means for giving the settings according to other altitudes.

In witness whereof I have hereunto set my hand this 20th day of April, 1921.

ROBERT V. MORSE.